Patented Oct. 14, 1941

2,258,681

UNITED STATES PATENT OFFICE 2,258,681

METHOD OF JOINING

Gustav O. Hoglund, New Kensington, Pa., assignor to Aluminum Company of America, Pittsburgh, Pa., a corporation of Pennsylvania No Drawing. Application April 14, 1939, Serial No. 267,915. In Canada April 15, 1939

3 Claims. (Cl. 113—112)

This invention relates to an improved method of joining metallic parts by the application of heat in conjunction with a filler material and a flux. The invention is applicable to the joining of metal parts generally, but it is described herein particularly as applied to the joining of aluminous (aluminum or aluminum base alloy) parts.

The object of this invention is to provide a novel method for joining individual parts of an article of manufacture into a unitary structure.

A further object of the present invention is to provide a method for the production of a great number of assembled units possessing jointure uniformity.

The attainment of a still further object is accomplished in that the invention provides a minimum number of operations, thereby effecting a substantial savings in production cost.

Further objects and advantages of the invention will be apparent from the following description wherein a preferred form of the invention is disclosed.

Heretofore, in producing certain types of unitary structure which have been assembled from a number of component parts, it has been the practice to assemble the individual parts with a joining metal, and after having applied a suitable flux thereto, to heat the assembly by a hand torch, a heated iron, or other heat applying means. In following this practice, considerable time is consumed by the operator in applying the necessary heat to make the joint, and uniformity of the completed joints is dependent to a great extent upon the skill of manipulation of the individual. If the heat necessary to effect the joining is supplied by furnace, the joining metal has generally taken the form of rod, wire, sheet, or foil. If this method of joining is practiced, variation in temperature of heat supply is not as likely as if effected by torch or iron; but there remains the probability of non-uniform joints because the joining metal is generally placed at the desired points of jointure by hand, and the likelihood of it being displaced as a result of movement of the assembly and to the application of flux is appreciable.

In practicing my novel method as applied to aluminum and its alloys, the joining metal takes the form of a film or coating integral with the parts to be joined. This film or coating is an aluminum-silicon alloy containing about 2 per cent to 12 per cent silicon, and may, by one method, be integrally joined to a base or core metal by rolling when heated. This results in the coating being joined to the core by an alloy bond. I have found that coatings containing silicon in this range possess certain unusual characteristics which make it posssible to make a sound joint by my method. These coatings, although extremely thin (usually less than .001 inch, for example) are capable of flowing upon application of a suitable flux and heat. When suitably heated, even though the coating be not completely fluid but in a plastic condition, a part of the alloy, largely of eutectic composition, spreads from adjacent areas towards any capillary space to make a sound fillet and joint without disturbance of the coating at points distant from the joint. This can be accomplished because silicon has a low enough rate of diffusibility so that when employed according to my method, as a coating of aluminum-silicon alloy on aluminum or aluminum alloy base, it does not, upon suitable application of heat, penetrate into the core to any appreciable extent. To this alloy other elements may be added for purposes of changing the appearance, mechanical properties, electrolytic potential (i. e., corrosion resistance), or other properties as may be desired. Such additions, however, should be made in such manner and amount as to avoid material depreciation of the above mentioned functions of the aluminum-silicon alloy.

It will be appreciated that in making the joining metal integral with the parts to be joined, the joining or filler material is always properly positioned with respect to the points of jointure, thereby obviating the likelihood of dislodging the filler material and thereby effecting improper joining. It will be realized that according to my method it is unnecessary to apply the joining material as, for example, by hand, thereby eliminating a step which has been necessary in the prior practice. My method is particularly advantageous in that it is possible to form joints in complicated structures in which it has heretofore been impossible, or at best impractical especially from a production standpoint, to position the joining metal. In addition, better control of the amount of filler material going into the completed joint is possible because the coating can be made to any uniform desired thickness.

In joining two pieces of steel by the use of a copper joining material, considerable care must be exercised in the application of heat, both as to degree and time even though there is a difference of about 800° in their melting points. A very difficult problem is presented, however, in joining aluminous parts with an aluminous coating material where the difference in melting points is less than 100°. I have discovered, however, that this can be regularly accomplished with a care consistent with commercial production operations if the particular filler material I have specified is employed in my method. For example, in the case of one alloy of aluminum which had been coated with an aluminum-silicon alloy of from about 5 per cent to 10 per cent silicon, the preferable furnace time and temperature range to effect a joining are about 6 to 10 minutes at from about 1075° F. to 1180° F. The melting point of the aluminum base alloy core is about 1200° F.

I have been successful in using an aluminum alloy joining material as a coating on aluminum or an aluminum base alloy, even though their melting points are not far apart because of my discovery that the aluminum-silicon alloy when partially melted and in plastic condition contains a fluid portion which will spread. Furthermore, this eutectic portion which flows or spreads into the joint is strong and tough.

In the present invention, sufficient heat is applied to cause the aluminum-silicon alloy coating to melt, at least in part, and enter between the individual parts to be joined. This may be carried out in a non-oxidizing environment by utilizing any suitable gas or mixture of gases.

In carrying out the steps of my novel method, the individual pieces which are to be joined are assembled and held in the relationship which they are to bear to one another in the finished unitary structure. This may be accomplished, for example, by means of a jig or other work holding device. A suitable flux is then applied at the places where it is desired to effect a jointing, and the furnace having been brought up to proper temperature, the assemblies are placed within it for a time sufficient to permit the desired flow of joining metal. The units may then be removed from the furnace or, if desired, they may be subjected to a regulated cooling treatment to effect metal characteristics. This may be accomplished, for example, by passing the units progressively from the furnace through an adjoining cooling unit.

It will be appreciated that I have invented a novel method and material for joining a plurality of aluminum or aluminum alloy parts by virtue of coating the aluminum or aluminum alloy parts with a joining or filler metal of aluminum-silicon alloy, and that in so doing I have eliminated the time consuming and expensive step of applying the filler metal by hand. It will also be appreciated that uniform joints are obtainable according to my practice, because the metal entering into the weld is carried as a coating of uniform thickness on the parts to be joined.

I claim:

1. The method of joining contiguous parts into a unitary structure which comprises providing at least one part of said structure as a composite aluminous body comprising a core and a coating, said coating consisting of an aluminum base alloy containing from about 2 per cent to about 12 per cent silicon and being integrally joined to said core by an alloy bond, assembling said parts into structure-forming relationship, applying a flux at points of jointure, and thereafter heating said assembly to render said coating sufficiently plastic to effect joining of said parts.

2. The method of joining contiguous parts into a unitary structure which comprises providing at least one part of said structure as a composite aluminous body comprising a core and a coating, said coating consisting of an aluminum base alloy containing from about 2 per cent to about 12 per cent silicon and being integrally joined to said core by an alloy bond, assembling said parts into structure-forming relationship, and heating the same in the presence of a flux to form joints between said parts, said joints being substantially of aluminum-silicon alloy eutectic composition.

3. The method of forming a unitary structure from contiguous parts which comprises providing at least one part as a composite aluminous body comprising a core and a coating, said coating being an aluminum base alloy containing from about 2 per cent to about 12 per cent silicon which begins to melt before said core and being integrally joined to said core by an alloy bond, assembling said parts into structure-forming relationship, applying a flux at points of jointure, and thereafter heating the assembled parts to render said coating sufficiently plastic and effect joining of said parts.

GUSTAV O. HOGLUND.